(12) United States Patent
Kumka et al.

(10) Patent No.: US 11,950,713 B2
(45) Date of Patent: Apr. 9, 2024

(54) DISPLAY STAND UNIT

(71) Applicant: Apple Inc., Cupertino, CA (US)

(72) Inventors: David Samuel Kumka, San Francisco, CA (US); Clayton R. Woosley, San Jose, CA (US); Daniel S. Foster, San Jose, CA (US); Eric Weijia Wang, Newark, CA (US); Gregory R. Ritter, Palo Alto, CO (US); Joshua Adams, San Jose, CA (US); Christopher Hu, San Francisco, CA (US); Priya K. Nambiar, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/665,174

(22) Filed: Feb. 4, 2022

(65) Prior Publication Data
US 2022/0408943 A1    Dec. 29, 2022

Related U.S. Application Data

(60) Provisional application No. 63/215,715, filed on Jun. 28, 2021.

(51) Int. Cl.
*A47F 7/024* (2006.01)
*A47F 7/00* (2006.01)
*E05B 73/00* (2006.01)
*G08B 13/14* (2006.01)
*H02J 7/00* (2006.01)

(52) U.S. Cl.
CPC .......... *A47F 7/0246* (2013.01); *A47F 7/0042* (2013.01); *E05B 73/0011* (2013.01); *E05B 73/0082* (2013.01); *G08B 13/1445* (2013.01); *H02J 7/0044* (2013.01)

(58) Field of Classification Search
CPC .......... A47F 7/0246; E05B 73/0011; G08B 13/1445
See application file for complete search history.

(56) References Cited

U.S. PATENT DOCUMENTS

| | | | | |
|---|---|---|---|---|
| 6,386,906 | B1 * | 5/2002 | Burke | G08B 13/1445 439/501 |
| 6,761,579 | B2 * | 7/2004 | Fort | H02G 11/00 340/568.1 |
| 6,799,994 | B2 * | 10/2004 | Burke | H02G 11/00 439/501 |

(Continued)

*Primary Examiner* — Hoi C Lau
(74) *Attorney, Agent, or Firm* — Sterne, Kessler, Goldstein & Fox P.L.L.C.

(57) ABSTRACT

Systems disclosed herein are directed to a display stand unit for a retail environment. The display stand unit includes a base having an interior and a display stand. The display stand includes a stem that connects to and extends upwardly from the base and a receiving surface that is suspended above and spaced away from the base by the stem. The receiving surface is configured to releasably hold an electronic device above and spaced away from the base. The display stand unit further includes a security cable that extends out from the base. The security cable is configured to attach to the electronic device to movably secure the electronic device to the base. The display stand unit further includes a retractor disposed within the interior of the base and connected to the security cable. The retractor automatically retracts the security cable.

24 Claims, 16 Drawing Sheets

(56) References Cited

U.S. PATENT DOCUMENTS

| | | | |
|---|---|---|---|
| 6,896,543 B2* | 5/2005 | Fort | H02G 11/00 340/568.1 |
| 7,667,601 B2* | 2/2010 | Rabinowitz | G08B 13/1961 340/568.2 |
| 7,724,135 B2* | 5/2010 | Rapp | G08B 13/149 340/568.1 |
| 7,744,404 B1* | 6/2010 | Henson | H01R 13/72 439/534 |
| 8,581,985 B2* | 11/2013 | Fawcett | G08B 13/1445 348/150 |
| 8,814,128 B2* | 8/2014 | Trinh | F16M 13/00 340/568.2 |
| 9,019,698 B2* | 4/2015 | Thiers | F16M 13/00 320/108 |
| 9,373,236 B2* | 6/2016 | Oehl | G08B 13/22 |
| 9,474,392 B2* | 10/2016 | Howarth | F16M 11/041 |
| 9,499,373 B1* | 11/2016 | Kim | B65H 75/4402 |
| RE47,089 E * | 10/2018 | Henson | H01R 13/72 |
| 10,206,522 B2* | 2/2019 | Yang | F16M 11/041 |
| 10,624,471 B2* | 4/2020 | Galant | F16M 13/00 |
| 10,750,885 B2* | 8/2020 | Hyma | F16B 33/002 |
| 11,221,101 B2* | 1/2022 | Yang | G08B 13/1418 |
| 11,448,356 B2* | 9/2022 | Horvath | F16M 13/02 |
| 11,466,477 B2* | 10/2022 | Gulick, Jr. | F16M 11/041 |
| 11,566,451 B2* | 1/2023 | Hall | G08B 13/1463 |
| 11,598,126 B2* | 3/2023 | Miles | G08B 13/1463 |
| 2001/0049222 A1* | 12/2001 | Fort | H02G 11/00 439/527 |
| 2002/0189842 A1* | 12/2002 | Burke | H02G 11/00 174/72 A |
| 2004/0229498 A1* | 11/2004 | Fort | H02G 11/00 439/502 |
| 2007/0152819 A1* | 7/2007 | Marszalek | G08B 13/1445 340/687 |
| 2007/0194918 A1* | 8/2007 | Rabinowitz | G08B 13/1961 340/568.2 |
| 2010/0118144 A1* | 5/2010 | Fawcett | G08B 15/001 348/143 |
| 2011/0187531 A1* | 8/2011 | Oehl | G08B 13/1445 340/568.1 |
| 2012/0188082 A1* | 7/2012 | Berglund | G08B 13/1445 340/568.2 |
| 2012/0205326 A1* | 8/2012 | Richter | A47F 7/024 307/38 |
| 2013/0134287 A1* | 5/2013 | Gresset | A47F 7/024 248/551 |
| 2014/0036074 A1* | 2/2014 | Fawcett | G08B 15/001 348/143 |
| 2014/0063238 A1* | 3/2014 | Abdollahzadeh | G08B 13/1445 348/143 |
| 2014/0092531 A1* | 4/2014 | Trinh | F16M 11/041 361/679.01 |
| 2014/0106608 A1* | 4/2014 | Howarth | F16M 13/00 248/176.1 |
| 2014/0340226 A1* | 11/2014 | Oehl | G08B 13/1445 340/568.4 |
| 2015/0028145 A1* | 1/2015 | Johnston | B65H 75/4484 242/390.8 |
| 2015/0208826 A1* | 7/2015 | Yang | F16M 11/041 248/316.1 |
| 2018/0279809 A1* | 10/2018 | Regan | A47F 5/13 |
| 2018/0322748 A1* | 11/2018 | Henson | G08B 25/10 |
| 2020/0141159 A1* | 5/2020 | Berglund | F16M 11/105 |
| 2020/0359811 A1* | 11/2020 | Hyma | F16B 33/002 |
| 2020/0400268 A1* | 12/2020 | Yang | G08B 13/1418 |
| 2021/0131149 A1* | 5/2021 | Miles | A47F 7/00 |
| 2021/0140202 A1* | 5/2021 | Hall | G08B 13/1463 |
| 2022/0128190 A1* | 4/2022 | Yang | F16M 11/40 |
| 2022/0408943 A1* | 12/2022 | Kumka | H02J 7/0044 |

* cited by examiner

DISPLAY STAND UNIT

CROSS REFERENCE TO RELATED APPLICATIONS

This application claims priority to and the benefit of U.S. Provisional Patent Application No. 63/215,715, filed Jun. 28, 2021, titled "Display Stand Unit," which is incorporated herein in its entirety by reference thereto.

FIELD

The described embodiments relate generally to a display stand unit, including one or more display stands that display and wirelessly charge products. More particularly, embodiments relate to display stands that incorporate a low-profile retractor within the display stand unit so that a security cable can be managed out of sight and without cable-management features.

BACKGROUND

Retail stores display products on tables. The devices are expensive and are routinely subject to theft attempts. To thwart such theft attempts, retailers use security cables that are secured directly to the table. A display stand unit is needed that directly manages security cables without compromising the form factor of the display stand and that secures against multiple different security cable tampering modes.

SUMMARY

Some embodiments described herein relate to a display stand unit for a retail environment. The display stand unit comprises a base having an interior and a display stand. The display stand comprises a stem that connects to and extends upwardly from the base and a receiving surface that is suspended above and spaced away from the base by the stem, the receiving surface is configured to releasably hold an electronic device above and spaced away from the base. The display stand unit further comprises a security cable that extends out from the base. The security cable is configured to attach to the electronic device to movably secure the electronic device to the base. The display stand unit further comprises a retractor disposed within the interior of the base and connected to the security cable. The retractor is configured to automatically retract the security cable.

Some embodiments described herein relate to a retractor for retractably securing a device via a security cable. The retractor comprises a stator comprising a fixture and an electronic contact that each extend through the stator, and a housing assembly. The housing assembly comprises a first housing rotatably coupled to the fixture. The first housing is fixed to the security cable and comprises a contact spring provided on a first side of the first housing. The contact spring is electronically coupled to an end of the security cable. The housing assembly further comprises a protrusion that extends from a second side of the first housing away from the stator. The protrusion creating a core wall around which the security cable is configure to spool. The housing assembly further comprises a second housing spaced away from the second side of the first housing. The retractor further comprises a torsion spring that biases the housing assembly in a retraction direction. The torsion spring comprising a first end that is attached to the fixture and a second end that is connected to at least one of the first housing and the second housing. The contact spring remains in direct electronic contact with the electronic contact of the stator as the first housing rotates about the fixture relative to the stator.

Some embodiments described herein relate to a display stand unit for a retail environment. The display stand unit comprising a base having an interior, a printed circuit board assembly disposed within the interior, and a display stand extending from the base. The display stand configured to removably hold a device. The display stand unit further comprising a security cable extending from the base and configured to attach to and secure the device to the base. The security cable comprising a security pod configured to be adhered to the device. The security pod comprising a resistor. The security cable and the resistor are connected in a security circuit and the printed circuit board assembly is configured to measure a resistance of the security circuit. The display stand unit further comprising an alarm connected to the printed circuit board assembly. The printed circuit board assembly is electrically connected to the security cable and is configured to receive electrical signals indicative of tampering with the security cable. The electrical signals indicative of tampering comprise the resistance of the security circuit measured by the printed circuit board assembly exceeding a tolerance. In response to detecting the electrical signals indicative of tampering with the security cable the printed circuit board assembly is configured to activate the alarm.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
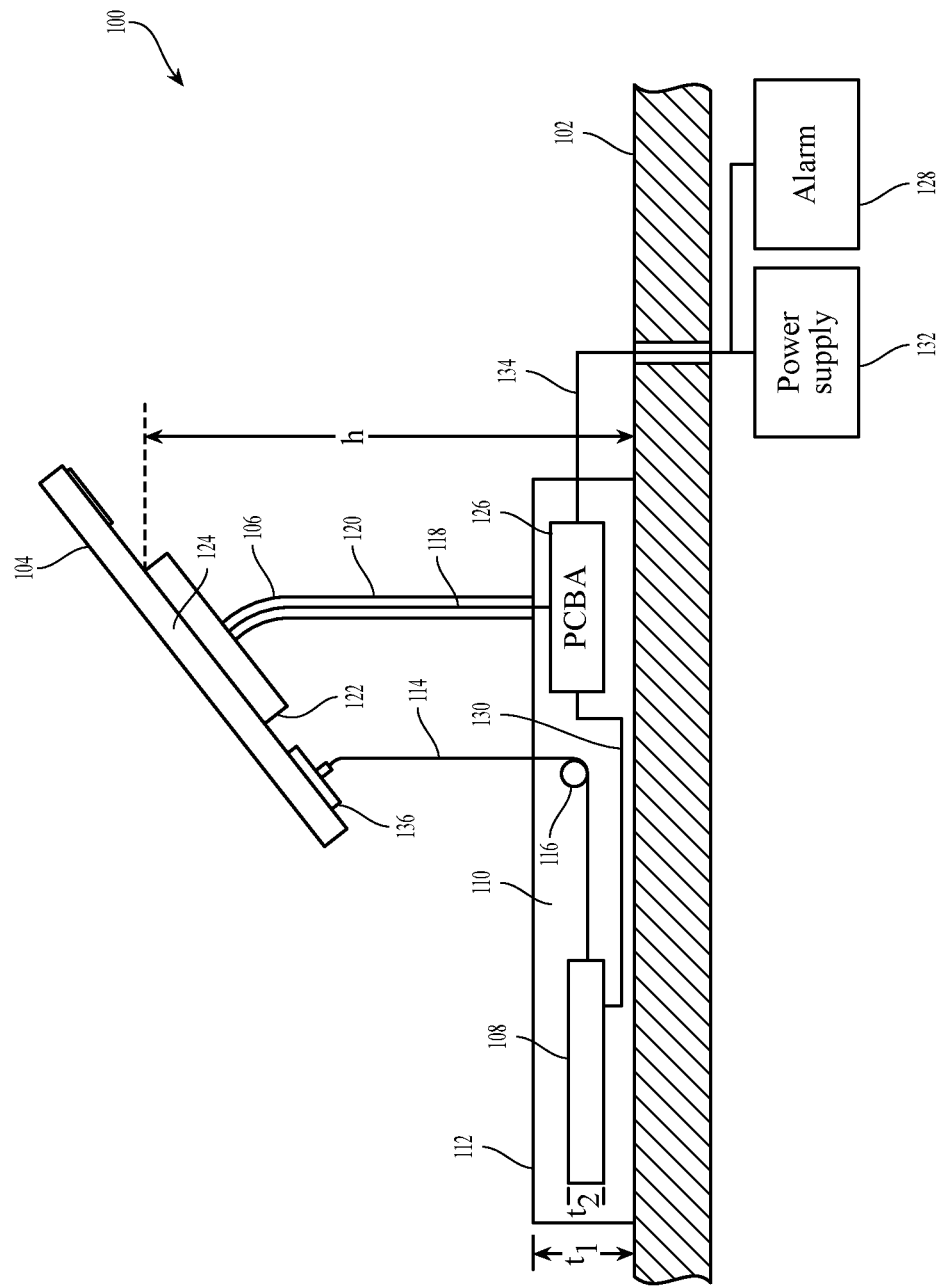
FIG. 1 shows a schematic view of an example display stand unit.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Some retailers provide product samples (sometimes called display models) for users to interact with to help them evaluate the product and its features. For example, a consumer-electronics retailer can provide display models for consumer-electronic devices such as smartphones, tablet computers, smartwatches, and other devices. The display models can be provided on retail display fixtures for a customer to pick up and evaluate. To deter theft and to maintain an orderly appearance, the display models can be tethered with a security cable to a display fixture, such as a table or other display unit. The display fixture (e.g., table) can incorporate a stand on which the display model can be set, and the tether can include a cable-management feature such as a retractor to keep the security cable neat and out of view when the display model is positioned on its display stand. Due to their size existing retractors are housed separately from display stands (e.g., below the table), which complicates the product displays and makes set up and maintenance cumbersome. Such configurations also involve integration with the table or other fixture on which they are displayed, often involving holes in the table for cable routing, or other complicated cable routing to a retractor incorporated into the table. This can complicate not only the display stand and table, but their assembly, repair, and maintenance.

Some embodiments discussed herein include a display stand unit, which can for example be displayed on a table of a retail store and used to display products for sale. The display stand unit can include one or more display stands that display and wirelessly charge display model consumer-electronic devices, such as a smart phone. The display stand unit itself can incorporate a low-profile retractor within the display stand unit, so that a security cable can be managed out of sight and without cable-management features being incorporated into the display fixture (e.g., table) itself.

The display stands can each include a charger mounted to a stem. The charger both magnetically holds and wirelessly charges a consumer-electronic device. To help deter theft, a security cable can be associated with each display stand to fix the consumer-electronic device to the display stand unit. The display stand unit can include a retractor for each of its display stands to automatically spool and hide the security cable when its associated consumer-electronic device is not being handled. The retractors can have a low-profile form factor to fit within a slim base of the display stand unit. Retraction of the retractor can be driven by a spring. The spring can exert a force sufficient to retract the security cable, but low enough that the pull on the security cable will not be significantly felt when interacting with the consumer-electronic fixed to the security cable.

In some embodiments, the retractor can be housed horizontally within an interior of a base of the display stand unit. The retractor can include an inner geometry that spools the security cable radially outwards along a single horizontal plane. This spooling arrangement ensures smooth extension and retraction of the security cable and mitigates against kinks, which improves i) the durability of the security cable and of the retractor and ii) the user experience with the secured consumer-electronic. The spooling arrangement also enables the low-profile design of the retractor, which allows the base of the display stand unit to accommodate the retractor in its interior while maintaining a sleek, unobtrusive profile.

The display stand unit can also include a guide, such as a roller, for each display stand that can direct the respective security cable from the interior of the base to the consumer-electronic device. The guide can change the orientation of the security cable from the horizontal orientation in the retractor to a vertical orientation and directs the security cable out of the interior of the base to the consumer-electronic. The guide can improve the durability of the security cable by reducing the friction against the display stand unit and can also support smooth extension and retraction of the security cable.

The display stand unit can also include a printed circuit board assembly that manages the wireless charging, electronically monitors the security cable for signals indicative of different security cable tampering modes, and triggers an external alarm if any of these signals are detected. The display stand unit with the printed circuit board assembly can secure against multiple different security cable tampering modes including, for example, removal of the security cable from the consumer-electronic, crimping or shorting of security circuitry, or cutting the security cable. For example, the printed circuit board assembly can detect attempts to crimp the security cable and short out the security circuitry by monitoring resistance levels of the security circuitry. If the printed circuit board assembly determines that the resistance is outside of a range, e.g., due to a theft attempt by crimping the security cable to short or bypass the security circuitry, the printed circuit board can trigger an alarm to alert store personnel of the potential theft.

An electronic interface cable can supply power to the display stand unit. The printed circuit board assembly can route the power to each of the consumer-electronics attached to the display stands via dedicated electronic interface cables that run through the stem of each display stand to the charger. Because the retractor is positioned within the base of the display stand unit and the security cable exits the base without running through the stem of the display stand, the stems of the display stands can be slimmer than display stands with internally managed security cables. The electronic interface cable that supplies power to the display stand unit can also connect the printed circuit board to the external alarm.

The display stand unit can include any number of display stands. For example the display stand unit can include a single display stand for displaying a single consumer-electronic device, or the display stand unit can include for example four display stands for displaying four consumer-electronic devices. The display stand unit can include artwork or other information provided on the base to showcase features of the displayed consumer-electronic.

These and other embodiments are discussed below with reference to FIGS. 1-17. Those skilled in the art will readily appreciate that the detailed description given herein with respect to these figures is for explanatory purposes only and should not be construed as limiting. Unless expressly indicated to the contrary or clear from context, the features of and relationships between like structures of any disclosed display stand units can apply to any other disclosed display stand units.

FIG. 1 shows a schematic of an example display stand unit 100. Display stand unit 100 can, for example, be displayed on a retail display fixture, such as a table 102, of a retail store and used to display products 104 for sale. The products 104 can include, for example, electronic devices such as smart phones, as shown in FIG. 1, smartwatches, tablets, etc. Display stand unit 100 can include one or more display stands 106 that display and in some embodiments wirelessly charge products 104. Display stand unit 100 itself can incorporate a retractor 108 within an interior 110 of a base 112 of display stand unit 100, so that a security cable 114 of display stand unit 100 can be managed out of sight and without cable-management features being incorporated into the retail display fixture (e.g., table 102) itself. Retractor 108 can automatically spool and hide security cable 114 when its associated product 104 is not being handled.

Figure 7:
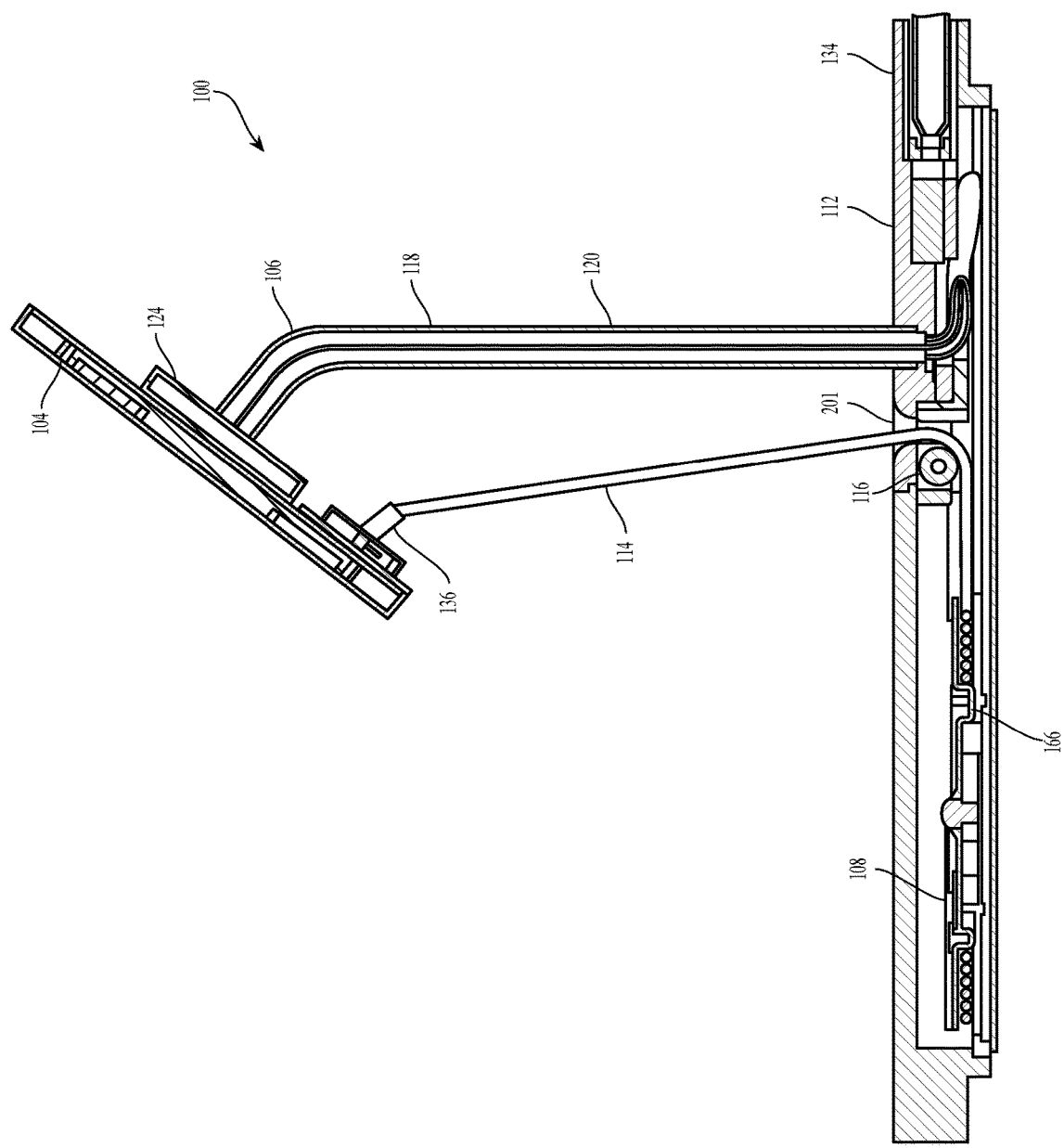
FIG. 7 shows a cross-section view of the example display stand unit of FIG. 2 along section line 7-7.

Retractor 108 can have a low-profile form factor to fit within the slim base 112 of display stand unit 100. Retractor 108 can be housed horizontally within interior 110 of base 112 of display stand unit 100. Retractor 108 can include an inner geometry, such as spiral, that spools security cable 114 radially outwards along a single horizontal plane without vertical overlap of security cable 114, as shown in FIG. 7. This spooling arrangement can ensure smooth extension and retraction of the security cable and can mitigate against kinks, which can improve i) the durability of security cable 114 and/or of retractor 108 and ii) the user experience with the secured product 104. The spooling arrangement also enables the low-profile design of retractor 108, which allows base 112 of display stand unit 100 to accommodate retractor 108 in interior 110 while maintaining a sleek, unobtrusive profile. Base 112 can, for example, have a vertical thickness of 12 mm±10% (e.g., thickness $t_1$ measured vertically from the top of table 102 in FIG. 1) and display stand unit 100 can have a maximum vertical height h as measured from the top of table 102 of 135 mm±10%. Because retractor 108 fits inside this thickness, retractor 108 can be less than 12 mm±10% thick. For example, retractor 108 can have a vertical thickness of 10 mm±10% (e.g., thickness $t_2$ measured vertically from the top of the display fixture 102 in FIG. 1). In embodiments, retractor 108 can have a thickness of about ⅚ a thickness of base 112.

Display stand unit 100 can also include a guide 116 that guides security cable 114 out of interior 110 of base 112. Guide 116 can transition the orientation of security cable 114 from a horizontal orientation within interior 110 of base 112 to a vertical orientation as security cable 114 extends from interior 110 of base 112. In embodiments, guide 116 can be a roller guide (e.g., that rotates about a horizontal axis as security cable 114 extends or retracts while against it).

Security cable 114 can be associated with each display stand 106 to fix product 104 to display stand unit 100 and reduce theft. Security cable 114 can attach to product 104 and can movably secure product 104 to base 112. For example, security cable 114 can include a security pod 136 that attaches to product 104. Security cable 114 can extend out from retractor 108 within interior 110 of base 112. Security cable 114 can extend out from base 112 separately from a charger interface cable 118 that supplies power to product 104. In embodiments, security cable 114 does not deliver power to product 104. In embodiments, security cable 114 can have a length sufficient to spool within retractor 108 without sagging when product 104 fixed to security cable 114 is held by display stand 106 and for a user to comfortably handle product 104 when product 104 is removed from display stand 106 by the user. For example, the length of security cable 114 can be between 800 mm and 1100 mm. In embodiments, the length of security cable 114 can be 918 mm±10%. In embodiments, the length of security cable 114 can be 988 mm±10%.

Display stand 106 can include a stem 120 that connects to and extends upwardly from base. Display stand 106 can include a receiving surface 122 that is suspended above and spaced away from base 112 by stem 120. Receiving surface 122 can releasably hold product 104 above and spaced away from base 112. In embodiments, display stand 106 can include magnets associated with receiving surface 122 to magnetically hold product 104 to receiving surface 122.

In embodiments, display stand 106 can include a charger 124 that defines receiving surface 122. Charger 124 can provide power to product 104 when product 104 is releasably held by receiving surface 122. Charger 124 can be a wireless charger (e.g., an induction charger) that wirelessly (e.g., inductively) charges product 104. Display stand 106 can further include the charger interface cable 118, which can extend through stem 120 from base 112. Charger interface cable 118 can be a power cable that supplies power to charger 124. Charger interface cable 118 can be a distinct cable from security cable 114. In embodiments, security cable 114 does not extend through stem 120 nor does security cable 114 provide power to product 104. In embodiments, charger 124 can be a wired charger and charger interface cable 118 can connect directly to product 104 to charge product 104.

In embodiments, display stand unit 100 can include a printed circuit board assembly 126. Printed circuit board assembly 126 can manage the wireless charging. For example, charger interface cable 118 can connect to printed circuit board assembly 126 and printed circuit board assembly 126 can manage power supplied to charger 124 via charger interface cable 118. Additionally or alternatively, printed circuit board assembly 126 can electronically monitor security cable 114 for signals indicative of different security cable tampering modes, and can trigger an alarm 128 if any of these signals are detected. Alarm 128 can be any type of device that can alert persons or security systems to tampering or the potential theft of product 104 including a device that can produce an audible alarm (e.g., a speaker), a visual alarm (e.g., light source), etc. Alarm 128 can be connected to display stand unit 100 but provided externally from display stand unit 100. For example, alarm 128 can be mounted underneath table 102. In embodiments with multiple display stands 106, a single alarm 128 may be associate with all display stands 106 of display stand unit 100. Accordingly, if the alarm 128 is triggered only one alarm 128 needs to be checked and/or rest.

In embodiments, retractor 108 can include a retractor interface cable 130 that electrically connects security cable 114 to printed circuit board assembly 126 via retractor 108. Printed circuit board assembly 126 can monitor security cable 114 for signals indicative of security cable tampering via retractor interface cable 130.

Printed circuit board assembly 126 can secure against multiple different security cable tampering modes including, for example, removal of security cable 114 from product 104, crimping or shorting of security circuitry of security cable 114, or cutting security cable 114. For example, the printed circuit board assembly 126 can detect attempts to crimp security cable 114 and short out the security circuitry by monitoring resistance levels of the security circuitry. If the printed circuit board assembly 126 determines that the resistance is outside of a range, e.g., due to a theft attempt by crimping security cable 114 to short or bypass the security circuitry, the printed circuit board assembly 126 can trigger alarm 128 to alert store personnel of the potential theft.

Printed circuit board assembly 126 can connect to a power supply 132, such as a wall outlet. In embodiments, display stand unit 100 can include a display stand unit interface cable (i.e., a single cable) that both supplies power to printed circuit board assembly 126 from power supply 132 and provides a communication pathway between alarm 128 and printed circuit board assembly 126. Using a single interface cable can help simplify the use and appearance of display stand unit 100. Alternatively, separate interface cables can be provided to connect alarm 128 and power supply 132 to printed circuit board assembly 126.

Display stand unit 100 can include any number of display stands 106. For example, display stand unit 100 can include a single display stand 106 for displaying a single product 104, or display stand unit 100 can include for example, two, three, four, or more display stands 106 for displaying multiple products 104. When multiple products 104 are displayed, products 104 may be the same or different from each other. In embodiments, display stand 106 can display different products 104 to allow consumers to handle and compare different products 104, e.g., smartphone models having different features, all from the same display stand 100.

Display stand unit 100 can include indicia, such as artwork or text. The indicia can improve consumer experience by providing information about displayed product 104. In embodiments, indicia may be provided on a magnetic sheet that can connect to the top of base 112. Magnetic sheet can be formed for example out of Biaxially-oriented polyethylene terephthalate.

Figure 2:
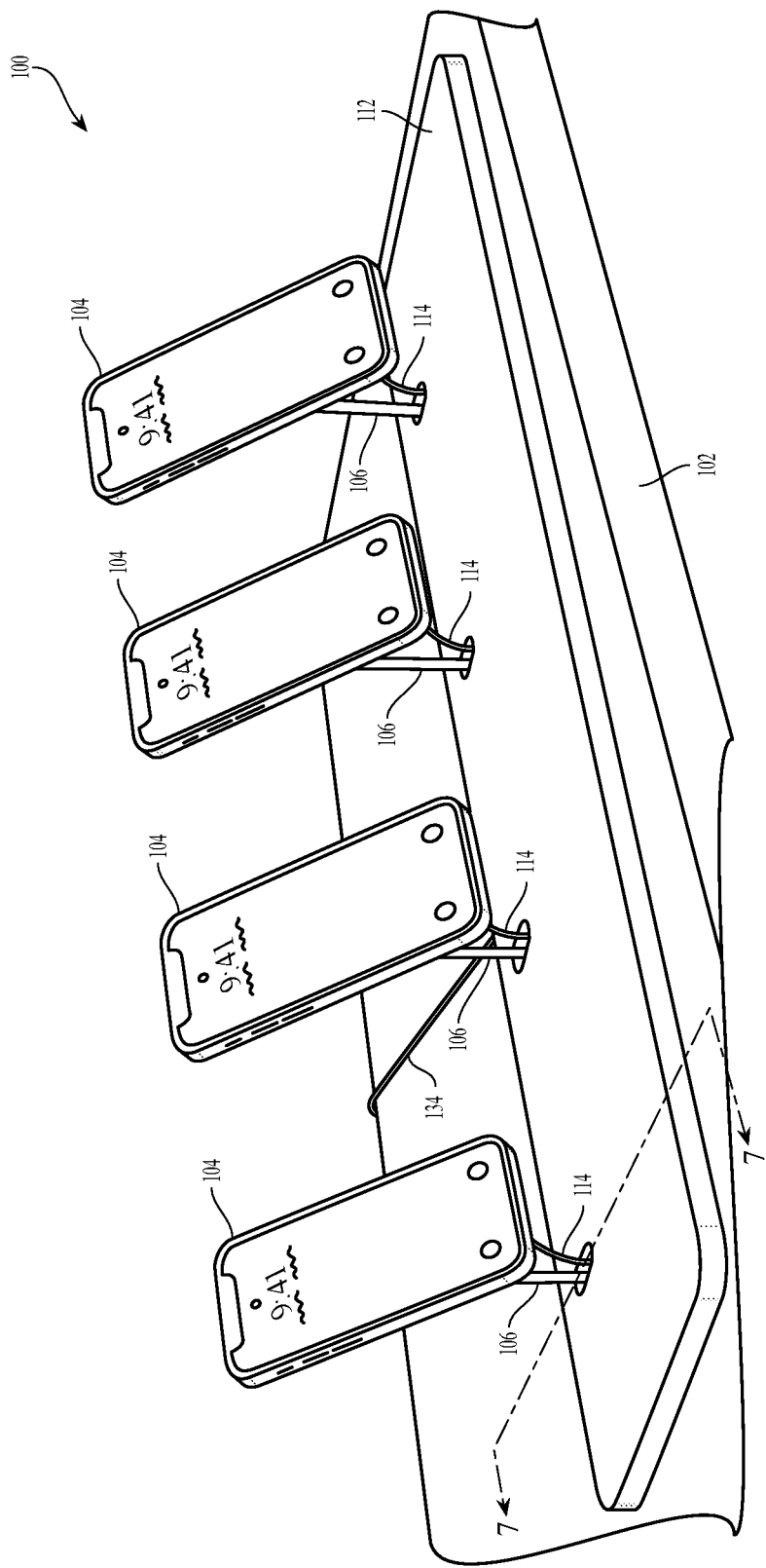
FIG. 2 shows a front perspective view of an example display stand unit with four display stands.
Figure 3:
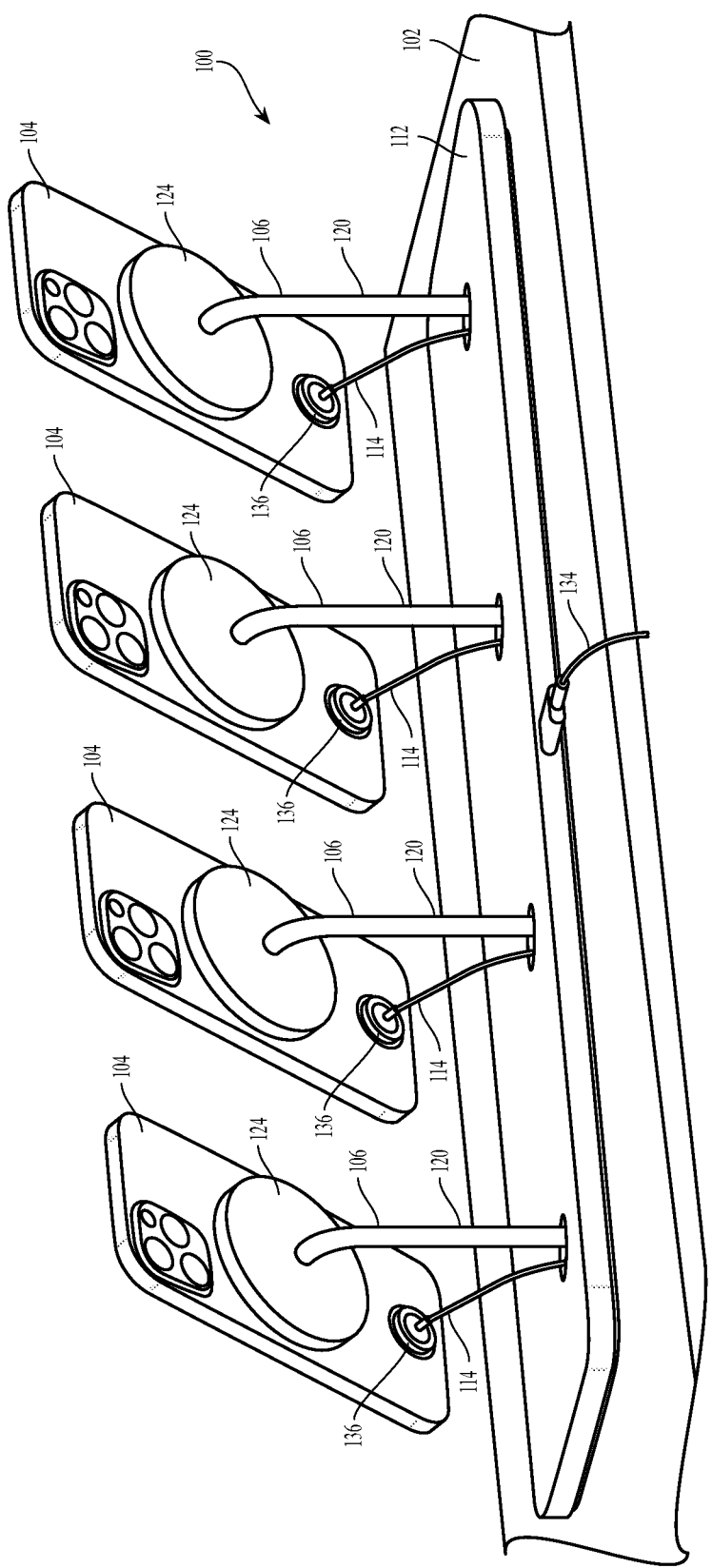
FIG. 3 shows a rear perspective view of the example display stand unit of FIG. 2.
Figure 4:
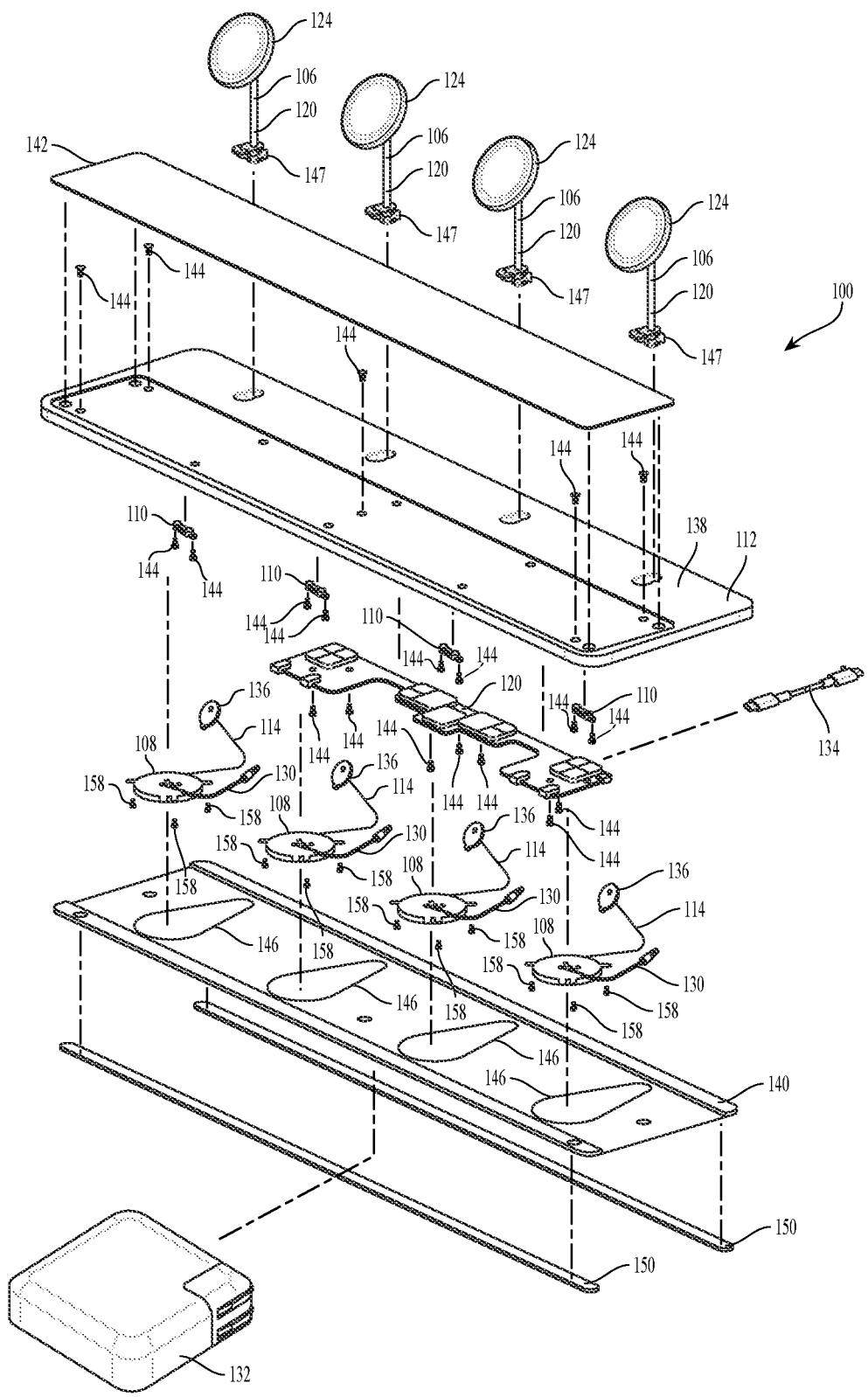
FIG. 4 shows an exploded view of the example display stand unit of FIG. 2.

FIGS. 2 and 3 respectively show front and rear perspective views of an example display stand unit 100 having for display stands 106. FIG. 4 shows an exploded view of display stand unit 100. Display stand unit 100 can be provided on or fixed to a retail display fixture, such as table 102. As shown in the exploded view of FIG. 4, base 112 can include a top 138 and bottom 140. Top 138 can include a cover 142 that is removable. Top 138 can include the indicia and in embodiments can be a magnetic sheet, as discussed above. Top 138 can provide access to fixtures 144 (e.g. screws) that fix top 138 to bottom 140, which can improve the serviceability of display stand unit 100. Top 138 can include holes 146 through which stems 120 of display stands 106 can extend. Display stands 106 can have a base 147, which can be mounted to an underside of top 138, for example, with fixtures 144 (e.g. screws). Bottom 140 can be a base plate that includes holes 148 for accommodating retractors 108. Interior 110 of base 112 that holds the retractors 108 can be defined by interior portions of top 138 and holes 148 of bottom 140. Guides 116 and printed circuit board assembly 126 can be mounted to top 138 with fixtures 144. In embodiments, a single printed circuit board assembly 126 can manage all display stands 106 and retractors 108 display stand unit 100. Retractors 108 can extend through holes 148 and sit in plane with bottom of bottom 140. This arrangement can promote the sleek, unobtrusive profile of base 112. Display stand unit 100 can also include feet 150 provided on the bottom of base 112. Feet 150 can provide extra clearance for base 112 (e.g., to accommodate retractor 108). Feet 150 can be adhered to table 102, which can fix display stand unit 100 to table 102 to inhibit theft or unauthorized interference with bottom 140 of display stand 100. Feet 150 can be removably attached to table 102 to improve serviceability of display stand 100, for example, to provide access to retractors 108 via holes 148.

Figure 5:
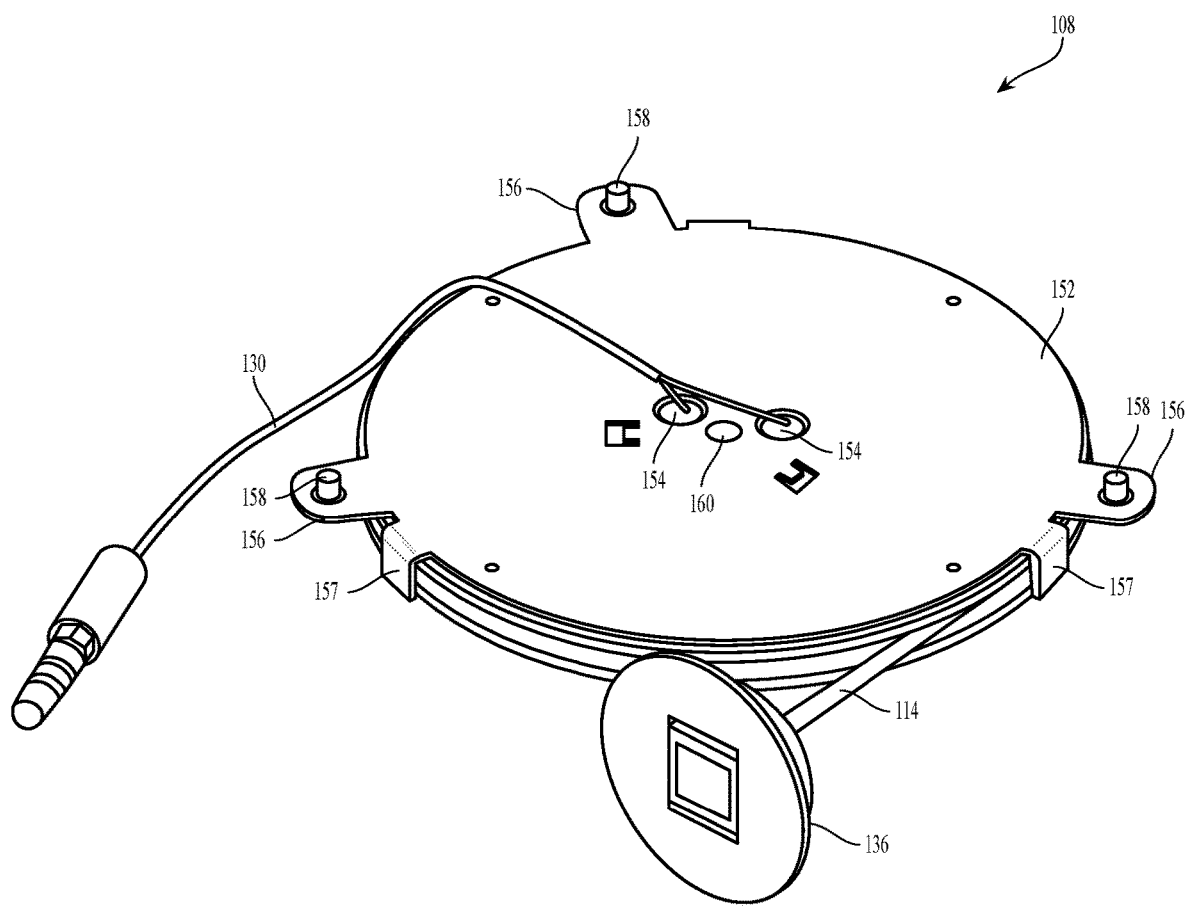
FIG. 5 shows a perspective view of an example retractor.
Figure 6:
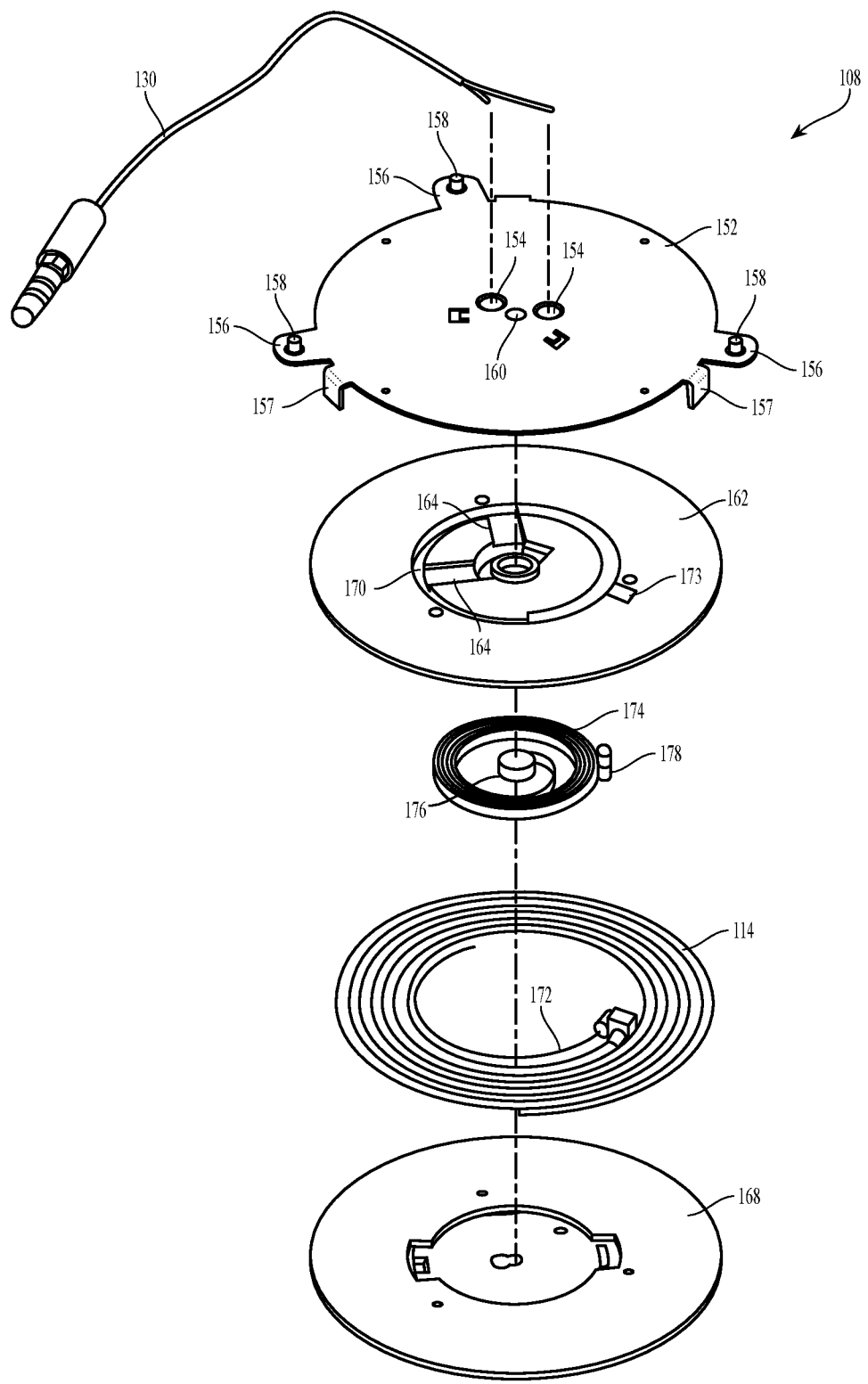
FIG. 6 shows an exploded view of the example retractor of FIG. 5.

FIGS. 5 and 6 respectively show a perspective an exploded view of an example retractor 108 that retractably secures product 104 via security cable 114. Retractor 108 can include a stator 152, which can be secured to a structure such as base 112. Stator 152 can include electrical contacts 154. Electrical contacts 154 can be connected to retractor interface cable 130 to provide electrical communication between retractor 108 and devices connected to retractor interface cable 130. Stator 152 can include mounts 156 that support fixtures 158 to fix retractor 108 to structures such as base 112. Stator 152 can include tabs 157 that can extend downwardly and can contain security cable 114 and/or other features of retractor 108.

Retractor 108 can include a housing assembly that can rotate about a central fitting, such as a pin 160, of stator 152 relative to stator 152 to retract security cable 114. Housing assembly can include a first housing 162 rotatably coupled to pin 160. First housing 162 can be fixed to security cable 114. First housing 162 can include contact springs 164 provided on a first side of first housing 162. Contact springs 164 can be electronically coupled to an end of the security cable 114. Contact springs 164 can also remain in direct electronic contact with electronic contacts 164 as first housing 162 rotates about pin 160 relative to stator 152. First housing 162 can also include a channel 170 and an end 172 of security cable 114 can extend through channel 170. First housing 162 can also include a hole 173 that end 172 of security cable 114 extends through. Hole 173 can fix end 172 to first housing 162 such that security cable 114 rotates together with first housing 162.

The housing assembly can also include a protrusion 166 that extends from a second side of the first housing away from stator 152 and that can form a core wall (e.g., of a spiral shape around which security cable 114 can spool. Because first housing 162 both maintains electrical contact with stator 152 and also spools security cable 114 the profile of retractor 108 can be minimized.

The housing assembly can also include a second housing 168 that can be spaced away from the second side of first housing 162 and that can be fixed to and rotate together with first housing 162. The housing assembly can form a spool around which security cable 114 can wind.

Retractor 108 can include a spring 174 that can bias the retractor to automatically retract security cable 114. Spring 174 can exert a force sufficient to retract the security cable, but low enough that the pull on the security cable will not be significantly felt when interacting with the product 104 fixed to the security cable. For example, when holding a product the additional pull from spring 174 on security cable 114 can feel as if a user is holding an extra 40 to 100 g. For example, the spring may exert a retraction force of between 0.4 and 1.0 Newtons. Spring 174 can include a first end 176 fixed to pin 160 and a second end 178 fixed to the housing assembly. Second end 178 can be fixed to first housing 162 and/or second housing 168.

FIG. 7 is a cross-section view from section line 7-7 of display stand unit 100 of FIG. 2 and depicts the slim unobtrusive, profile of display stand unit 100 as well as the compact form factor of retractor 108. For example, a width of base 112 (i.e., from a front end of base 112 on retractor 108 side of base 112 to a back end of base 112 on display stand unit interface cable 134 side of base) may be roughly the same as a height of display stand unit 100 as measured from a bottom of base 112 that rests on table 102 to a top of display stand 106 at charger 124. FIG. 7 also shows parallel paths that security cable 114 and charger interface cable 118 take out of base 112 towards product 104.

Figures 8, 9:
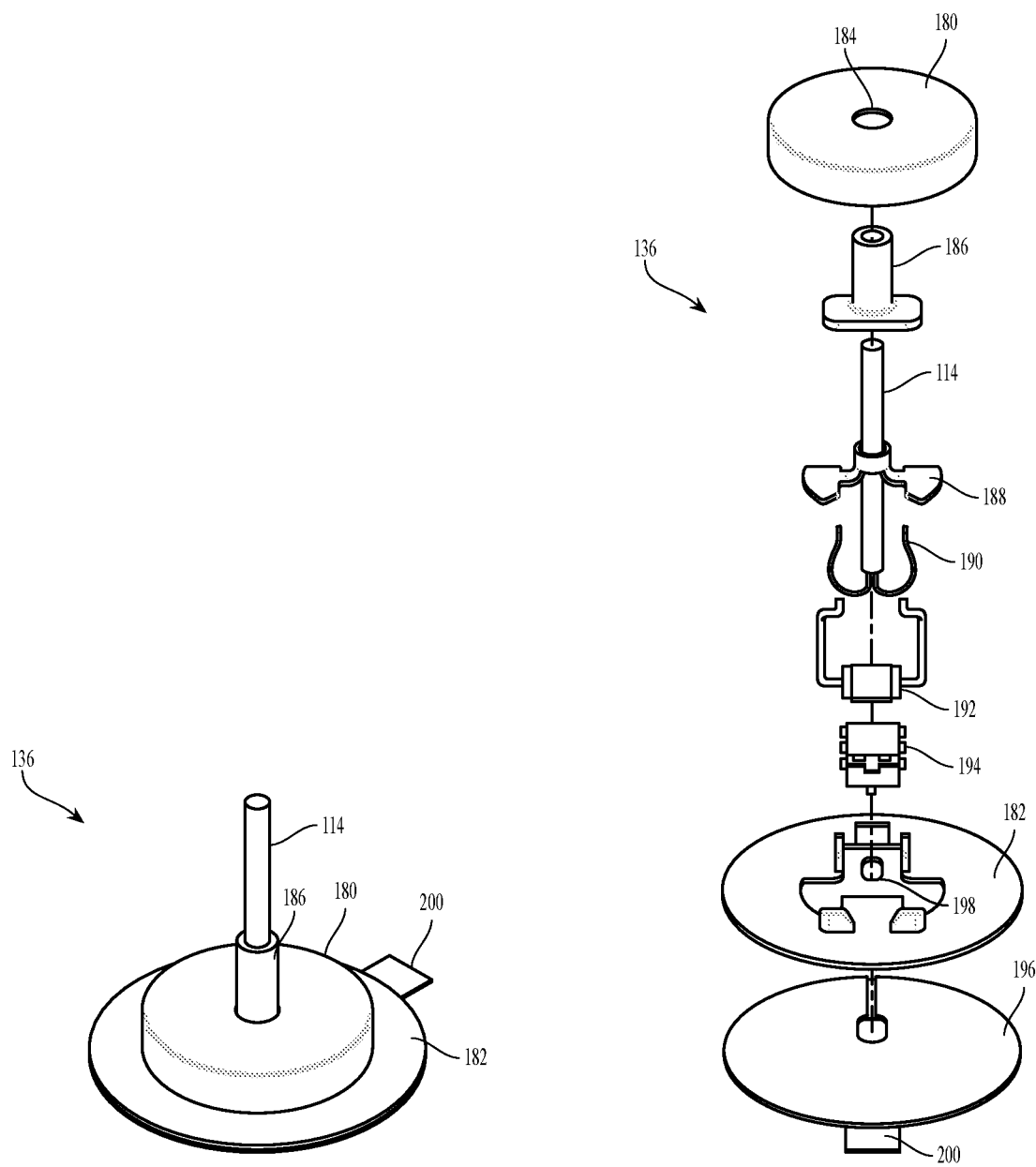
FIG. 8 shows a perspective view of an example security pod.
FIG. 9 shows an exploded view of the example security pod of FIG. 8.

FIGS. 8-9 respectively show a perspective view and an exploded view of an example security pod 136 of security cable 114, which can house security features of security cable 114. Security pod 136 can be adhered to product 104. Security pod 136 can include a top enclosure 180 and a bottom enclosure 182 that fit together and form an enclosure. The top enclosure can include a hole 184 that accommodates an end of security cable 114. Security pod 136 can include a fitting 186 that extends through hole 184 of top enclosure 180. The end of security cable 114 can extend through fitting 186 and fitting 186 can improve the fit of security cable 114 within the hole 184 of top enclosure 180 and protect security cable 114 from degradation caused by friction against top enclosure 180. Security cable 114 can include a clamp 188 to securely fix the end of security cable 114 to bottom enclosure 182. The end of the security cable 114 can include electrical leads 190.

Security pod 136 can include a resistor 192 having a resistance and that is connected to electrical leads 190 of the end of security cable 114. In embodiments, security pod 136 can additionally or alternatively include a security switch 194 that is connected to electrical leads 190 of the end of security cable 114. In embodiments in which security pod 136 includes both resistor 192 and security switch 194, resistor 192 and security switch 194 can be connected to the electric leads 190 in series to form a security circuit with security cable 114.

Security pod 136 can also include an adhesive layer 196 that adheres bottom enclosure 182 to product 104. In embodiments, product 104 can be sanded prior to attachment of adhesive layer 196 to improve adhesion between security pod 136 and product 104. Additionally or alternatively, in embodiments transfer tape can be provided between adhesive layer 196 and product 104 to improve adhesion between security pod 136 and product 104. Bottom enclosure 182 can include a hole 198 and a tab 200 of security switch 194 can extend through hole 198 into adhesive layer 196. In this configuration, when bottom enclosure 182 is removed from product 104 tab 200 remains adhered to product 104 and opens security switch 194, as discussed further below.

Figure 10:
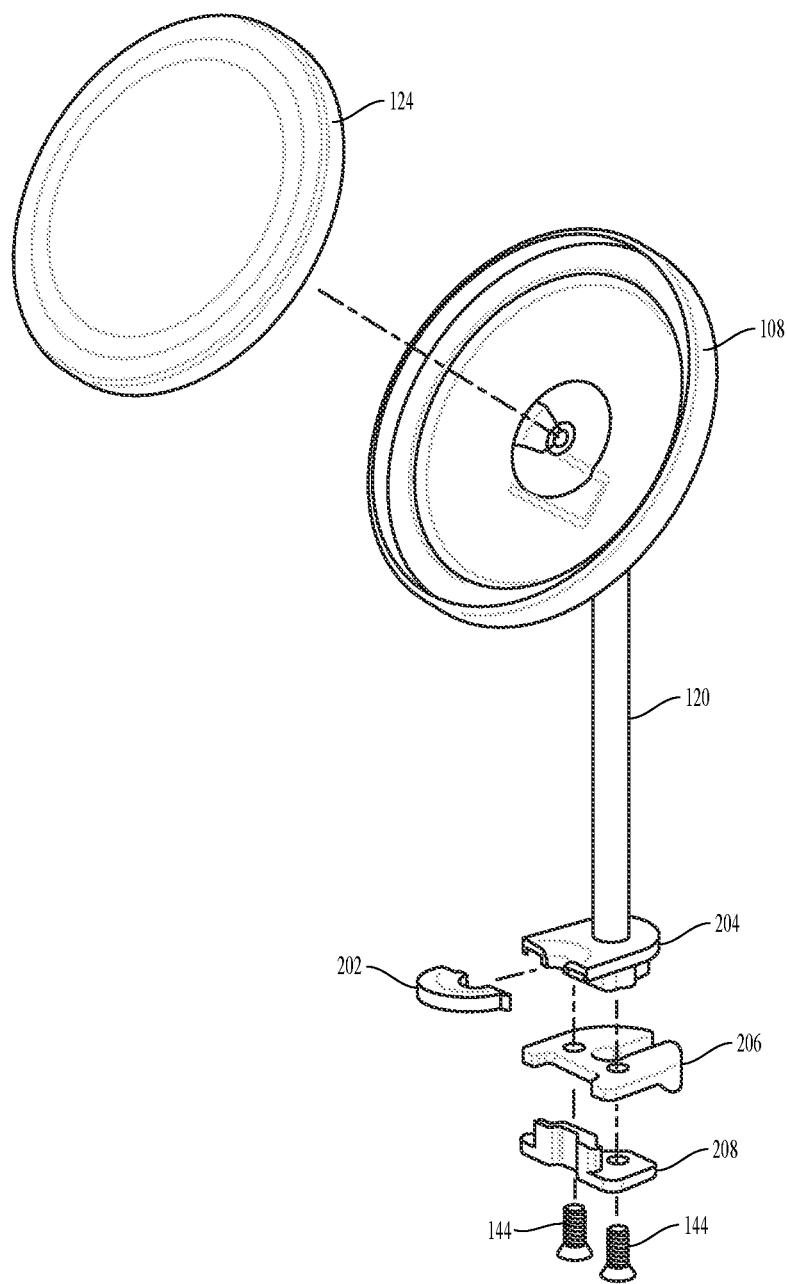
FIG. 10 shows an exploded view of an example display stand.

FIG. 10 shows an exploded view of an example display stand 106. Display stand 106 can also include a holder that holds charger 124. In embodiments, charger 124 and holder can have a circular form factor. In embodiments, stem 120 can be formed of aluminum or other suitable material. In embodiments outer surfaces of charger 124 can be formed of plastic or other suitable material.

Base 147 of display stand 106 can include a hole 201, as shown in FIG. 7, through which security cable 114 can exit. Hole 201 can be bigger than the diameter of security cable 114 (e.g., about twice the diameter of security cable 114). Hole 201 can also be smaller than a width or diameter of security pod 136 (e.g., about ⅙ the width or diameter of security pod 136), which can prevent be security pod 136 from retracting into base 112 of display stand 100. Base 147 can include multiple portions. For example, base 147 can include a first portion 202 and a second portion 204 separable along a parting line that bisects hole 201 through which security cable 114 can exit. This arrangement improves the serviceability of display stand unit 100, since first portion 202 and second portion 204 can split to accommodate security pod 136 during service or replacement of security cable 114. Base 147 can also include a third portion 206 and a fourth portion 208 that together with fixtures 144 fit base 147 of display stand 106 to base 112 of display stand unit 100.

Figure 11:
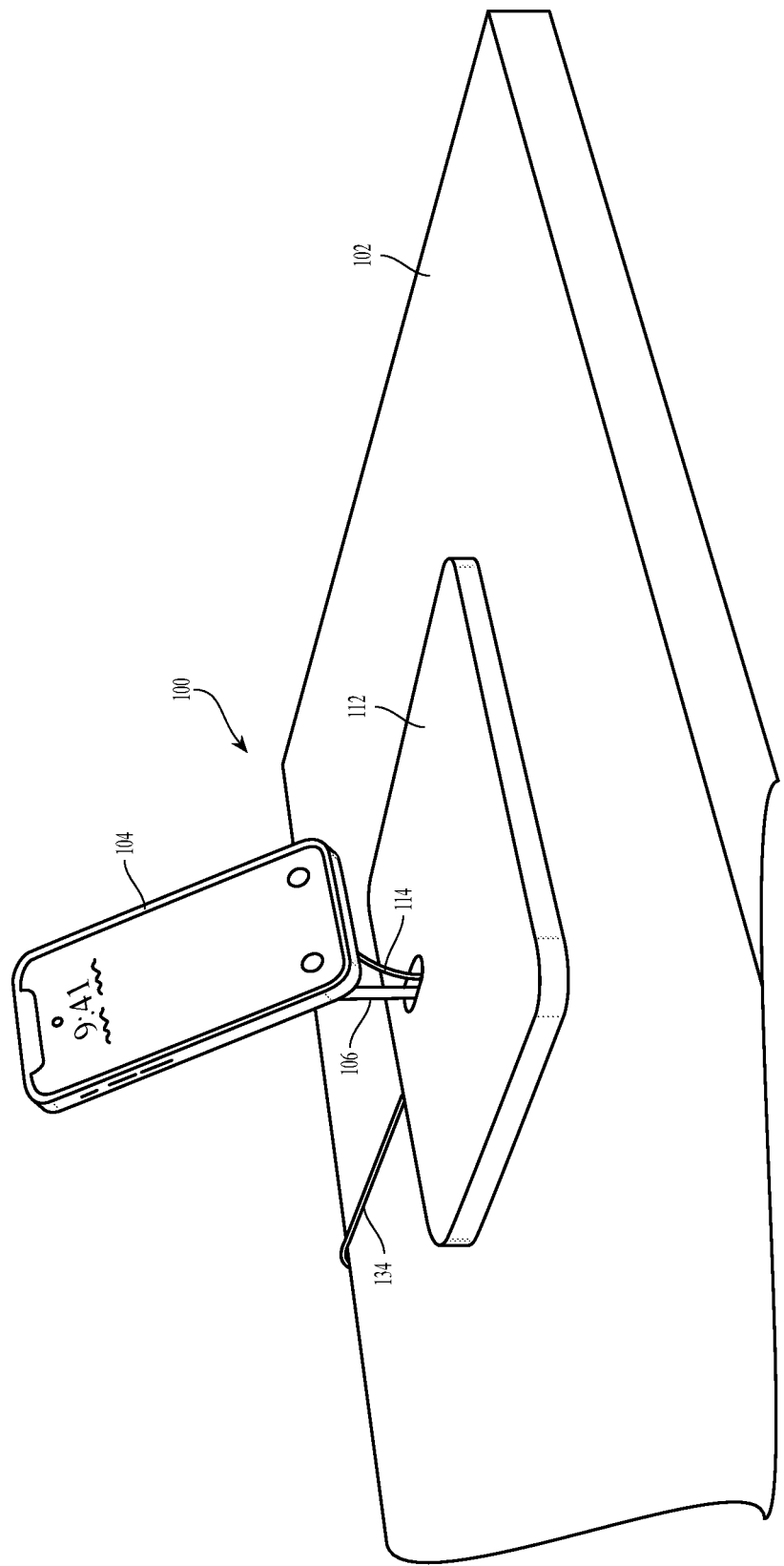
FIG. 11 shows a front perspective view of an example display stand unit with one display stand.
Figure 12:
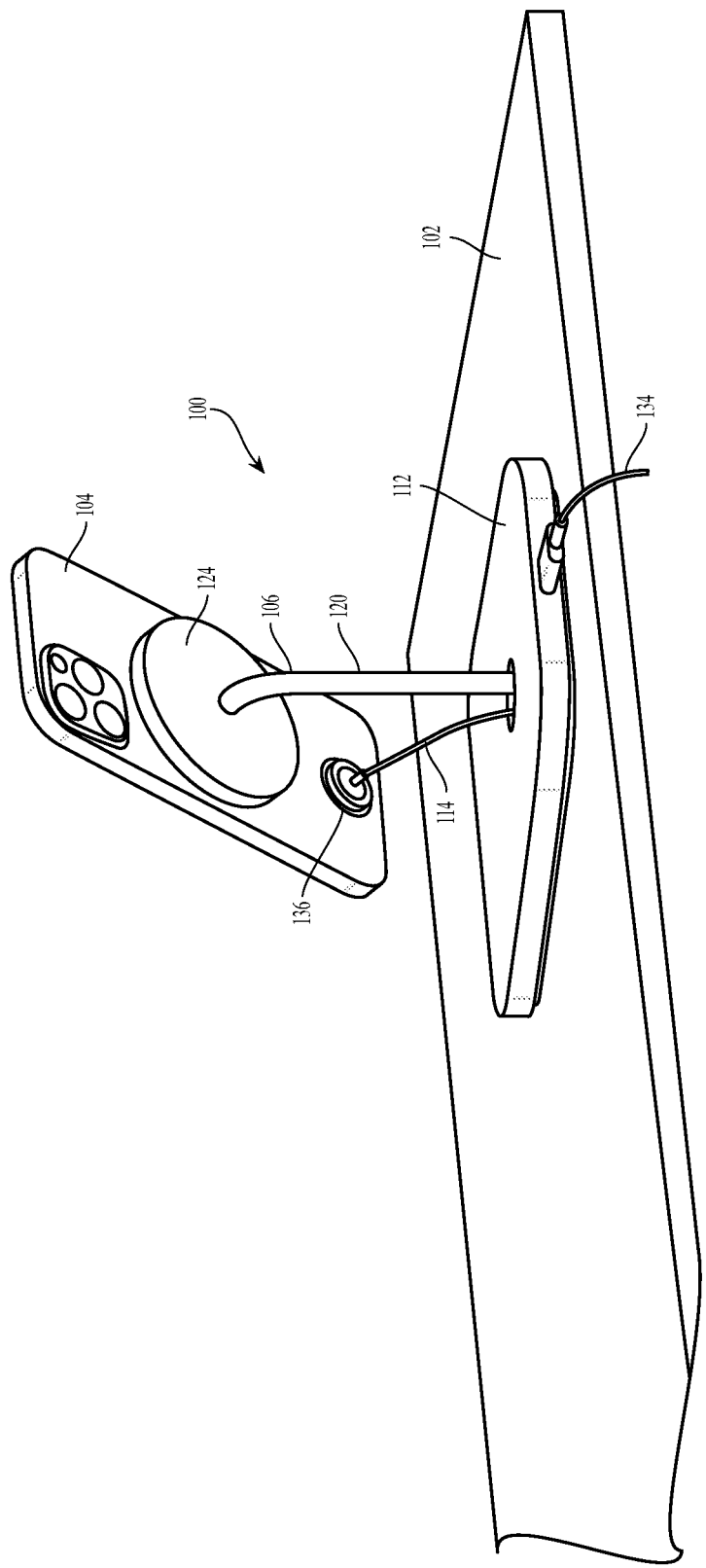
FIG. 12 shows a rear perspective view of the example display stand unit of FIG. 11.
Figure 13:
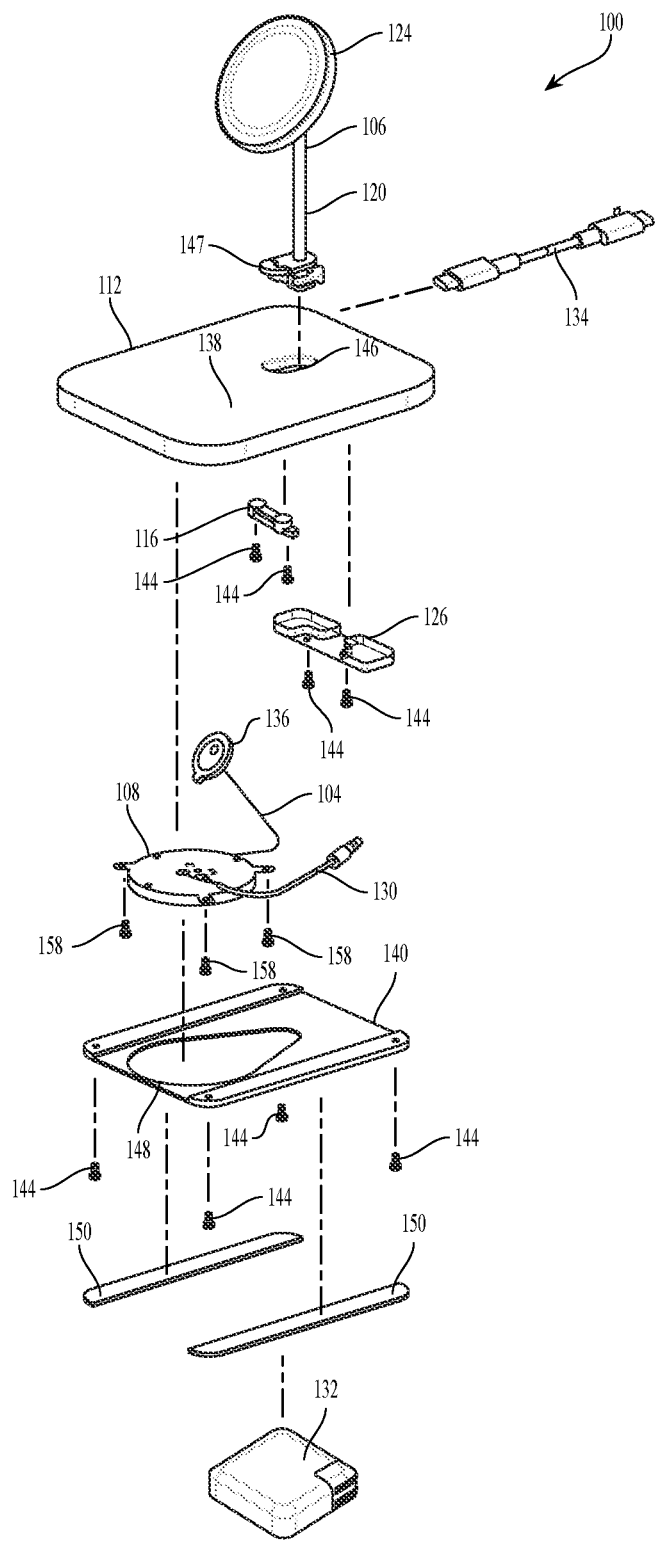
FIG. 13 shows an exploded view of the example display stand unit of FIG. 11.

FIGS. 11-13 respectively show front perspective, rear perspective, and exploded views of another example display stand unit 100 having a single display stand 106. Features of this display stand unit 100 are similar to those of the display stand unit 100 depicted in FIGS. 2-4, except that base 112 can be reduced in size to accommodate the single display stand 106 and single retractor 108 with less of a footprint on table 102. In embodiments, fixtures 144 can fix bottom 140 to top 138 of base 112 such that bottom 140 can be removed for example to service retractor 108.

Figure 14:
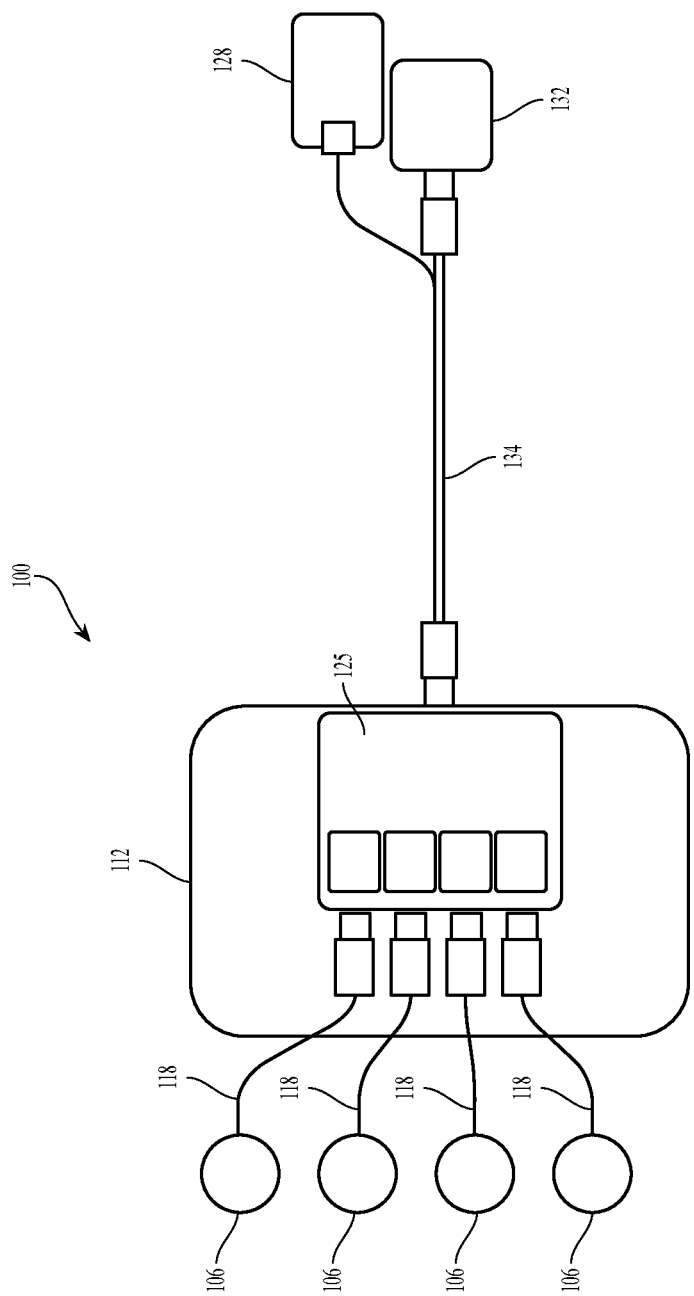
FIG. 14 shows another schematic view of an example display stand unit.
Figure 15:
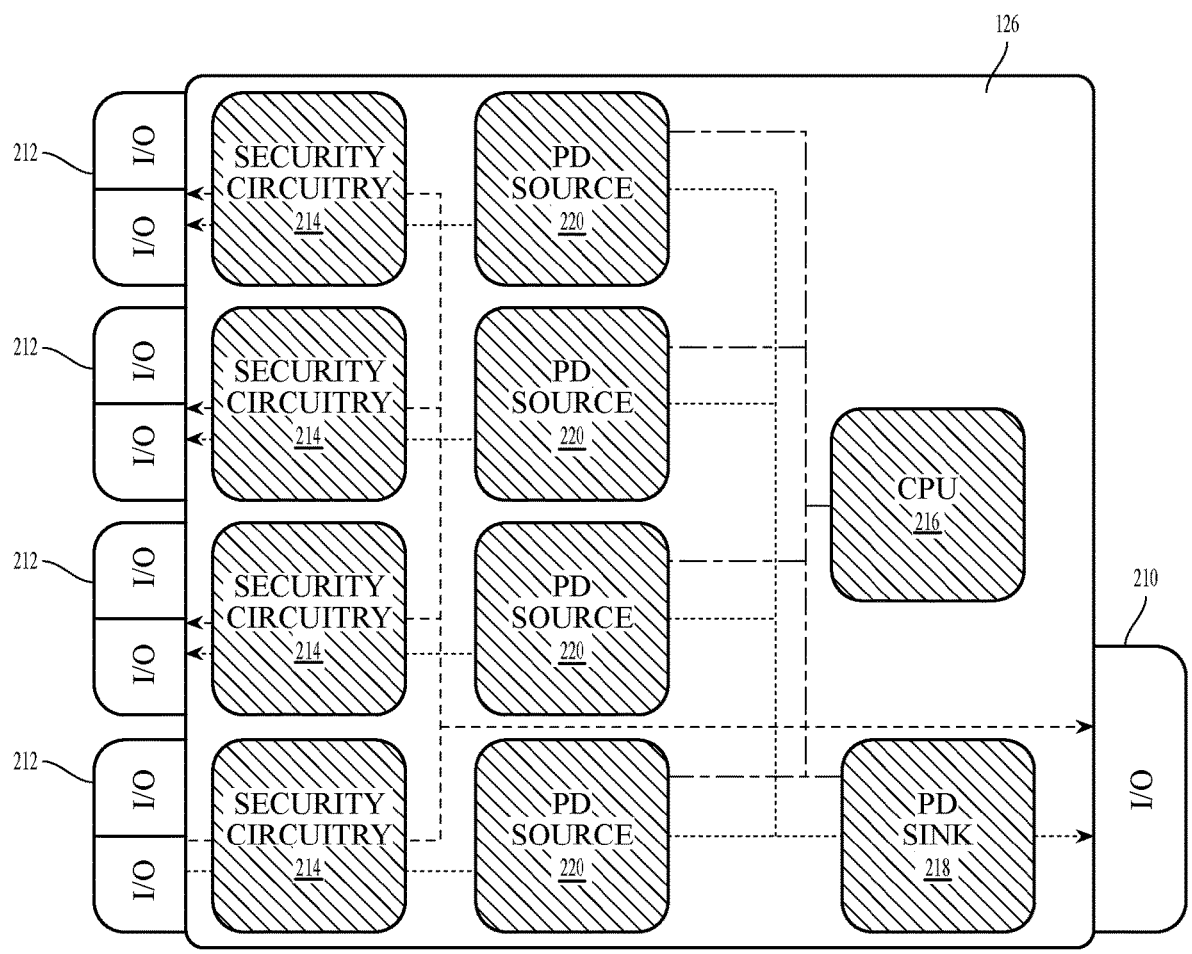
FIG. 15 shows a schematic view of an example printed circuit board assembly.

FIG. 14 shows a schematic example of a display stand unit 100 having four display stands 106. FIG. 15 shows a schematic view of an example printed circuit board assembly the display stand unit 100 of FIG. 14. Printed circuit board assembly 126 can include an input/output 210. Input/output 210 can be connected via display stand unit interface cable 134 to alarm 128 and power supply 132. Printed circuit board assembly 126 can include input/outputs 212 for each display stand 106. Each input/output 212 for each display stand 106 can include separate input/outputs for respectively connecting to charger interface cables 118 and retractor interface cables 130. Printed circuit board assembly 126 can thus separately direct power from power supply 132 to display stands 106 via charger interface cables 118 and monitor security circuitry 214 of security cable 114 for signals indicative of theft modes via retractor interface cables 130.

Printed circuit board assembly 126 can include a CPU 216 that manages all functions of the printed circuit board assembly. Printed circuit board assembly 126 can also include a power delivery sink 218 and power delivery sources 220 for regulating power. Appropriate structures of display stand unit 100, such as the printed circuit board 126 (e.g., input/outputs 210, input/outputs 210), display stand unit interface cable 134, etc. can conform to USB protocols, for example the USB-c protocol. In embodiments, printed circuit board assembly 126 can be modified to accommodate any number of display stands 106 by increasing or decreasing the number of input/outputs 212, security circuits 214, and power delivery sources 220.

Figure 16:
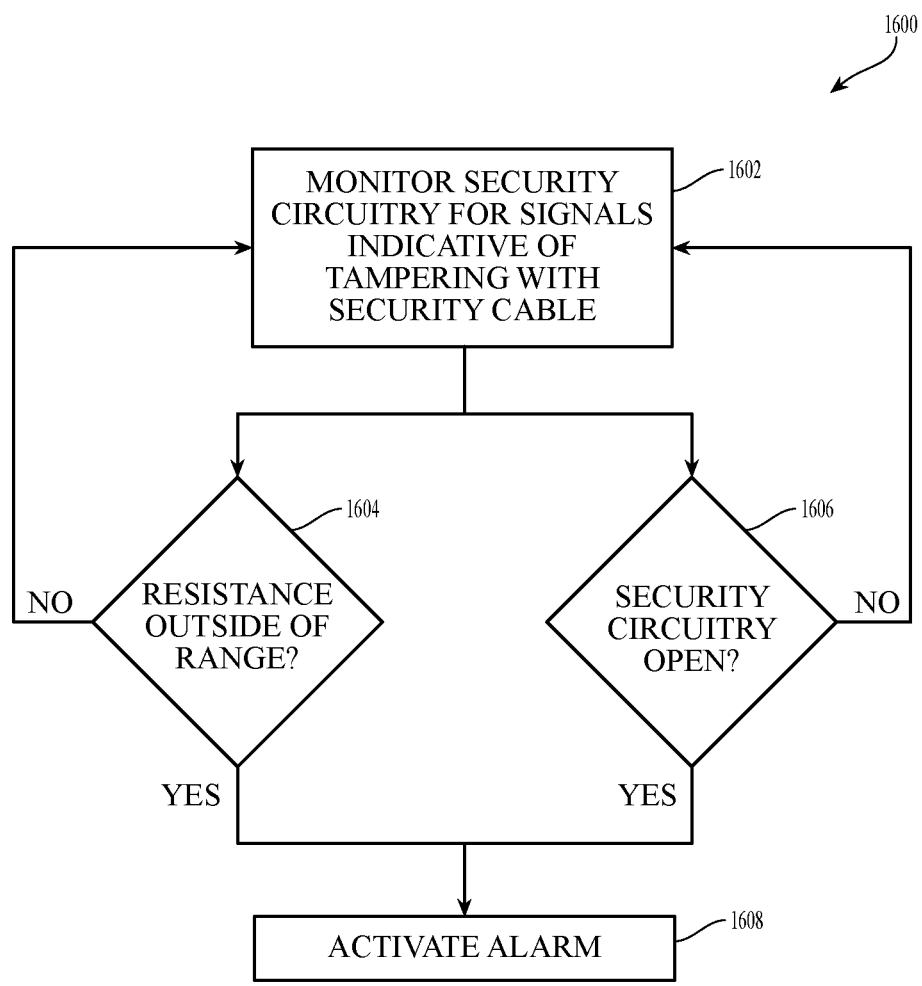
FIG. 16 shows an example monitoring process.

FIG. 16 shows an example monitoring process 1600 using display stand unit 100. Printed circuit board assembly 126 can utilize monitoring process 1600 to monitor any and all security circuitry 214 connected to printed circuit board assembly 126, e.g., via retractor interface cables 130. Monitoring process 1600 can include, at step 1602, monitoring security circuitry 214 for signals indicative of tampering with security cable 114. As discussed above, security circuitry 214 can include security cable 114, resistor 192, and/or security switch 194, which can all be connected to printed circuit board assembly 126 via retractor interface cables 130.

Monitoring process 1600 can include, at step 1604, evaluating whether a resistance of security circuitry 214 is outside of range. For example, printed circuit board assembly 126 can measure the resistance of security circuitry 214 and compare the measured resistance against an expected resistance value. Printed circuit board assembly 126 can determine that the resistance of security circuitry 214 is outside of range if the measured resistance is outside a tolerance (e.g., ±10%) of the expected resistance value (i.e., a signal indicative of tampering with security cable 114). The expected resistance value can be based upon a size of resistor 192 of security circuitry 214. If printed circuit board assembly 126 determines the resistance of security circuitry 214 is outside of range, monitoring process 1600 can proceed to step 1608 of monitoring process 1600, at which alarm 128 is activated to alert personnel of a potential theft of product 104. If printed circuit board assembly 126 determines the resistance of security circuitry is not outside of range, monitoring process 1600 can repeat step 1602 and continue monitoring security circuitry 214.

Monitoring process 1600 can include, at step 1606, evaluating whether security circuitry 214 is open. Printed circuit board assembly 126 can receive signals from security circuitry 214 that indicate that security circuitry 214 is open, which can correspond to a signal indicative of tampering with security cable 114. For example, security switch 194 can open security circuitry 214 upon an attempt to remove security pod 136 from product 104 and printed circuit board assembly 126 can measure security circuitry 214 to detect that it is open. As another example, security circuitry 214 can open if security cable 114 is cut and printed circuit board assembly 126 can measure security circuitry 214 to detect that it is open. If printed circuit board assembly 126 determines security circuitry 214 is open, monitoring process 1600 can proceed to step 1608 of monitoring process 1600, at which alarm 128 is activated to alert personnel of a potential theft of product 104. If printed circuit board assembly 126 determines security circuitry 214 is not open, monitoring process 1600 can repeat step 1602 and continue monitoring security circuitry 214.

In embodiments in which multiple display stands 106 are provided on the same display stand unit 100, a single printed circuit board assembly 126 can monitor display stands. Displays stand 100 can include an indicator (e.g., an LED light) for example under base 112 for each display stand 106 that can indicate (e.g., illuminate) the display stand 106 associated with the signal indicative of the theft attempt that activated alarm 128.

Accordingly, monitoring process 1600 can monitor for multiple types of theft attempts. First, attempts to remove security pod 136 from product 104 can cause the security switch 194 to open security circuitry 214, which would be detected for example at step 1606. Second, attempts to cut security cable 114 would also open security circuitry 214, which would also be detected for example at step 1606. Third, attempts to crimp security cable 114 to short out security circuitry 214 can move the resistance of security circuitry 214 out of range, which would be detected for example at step 1604.

Figure 17:
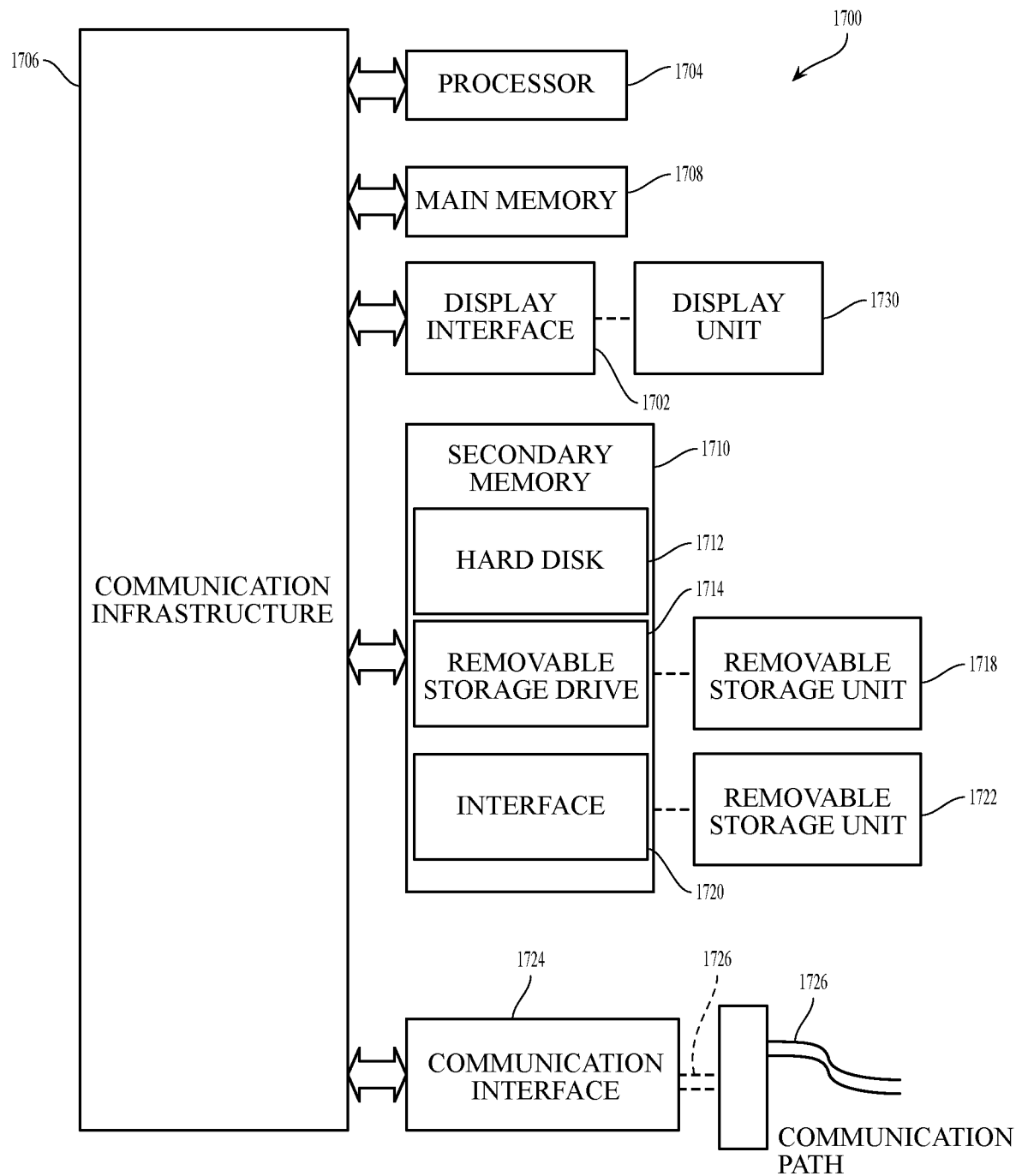
FIG. 17 shows a schematic view of an example computer.

Features of the display stand units (e.g., printed circuit board assembly, products, etc.) discussed herein may each include one more aspects of a computer. FIG. 17 illustrates an example computer 1700, aspects of which can be incorporated into features (e.g., printed circuit board assembly, products) of the display stand units.

In embodiments, computer 1700 can be implemented as computer-readable code.

If programmable logic is used, such logic may execute on a commercially available processing platform or a special purpose device. One of ordinary skill in the art may appreciate that embodiments of the disclosed subject matter can be practiced with various computer configurations, including multi-core multiprocessor systems, minicomputers, and mainframe computers, computer linked or clustered with distributed functions, as well as pervasive or miniature computers that can be embedded into virtually any device.

For instance, at least one processor device and a memory can be used to implement the above described embodiments. A processor device can be a single processor, a plurality of processors, or combinations thereof. Processor devices may have one or more processor "cores."

Various embodiments of the inventions can be implemented in terms of this example computer 1700. After reading this description, it will become apparent to a person skilled in the relevant art how to implement one or more of the inventions using other computers or computer architectures. Although operations can be described as a sequential process, some of the operations may in fact be performed in parallel, concurrently, or in a distributed environment, and with program code stored locally or remotely for access by single or multi-processor machines. In addition, in some embodiments the order of operations can be rearranged without departing from the spirit of the disclosed subject matter.

Processor 1704 can be a special purpose or a general purpose processor device. As will be appreciated by persons skilled in the relevant art, processor 1704 may also be a single processor in a multi-core/multiprocessor system, such system operating alone, or in a cluster of computing devices operating in a cluster or server farm. Processor 1704 is connected to a communication infrastructure 1706, for example, a bus, message queue, network, or multi-core message-passing scheme.

Computer 1700 can include a main memory 1708, for example, random access memory (RAM), and may also include a secondary memory 1710. Secondary memory 1710 may include, for example, a hard disk drive 1712, or removable storage drive 1714. Removable storage drive 1714 may include a floppy disk drive, a magnetic tape drive, an optical disk drive, a flash memory, a Universal Serial Bus (USB) drive, or the like. The removable storage drive 1714 reads from or writes to a removable storage unit 1718 in a well-known manner. Removable storage unit 1718 may include a floppy disk, magnetic tape, optical disk, etc. which is read by and written to by removable storage drive 1714. As will be appreciated by persons skilled in the relevant art, removable storage unit 1718 includes a computer usable storage medium having stored therein computer software or data.

Computer 1700 may include a display interface 1702 (which can include input and output devices such as keyboards, mice, etc.) that forwards graphics, text, and other data from communication infrastructure 1706 (or from a frame buffer not shown) for display on a display unit 1730 (e.g., display screen, electronics of the dynamic input blocks, etc.).

In implementations, secondary memory 1710 may include other similar means for allowing computer programs or other instructions to be loaded into computer 1700. Such means may include, for example, a removable storage unit 1722 and an interface 1720. Examples of such means may include a program cartridge and cartridge interface (such as that found in video game devices), a removable memory chip (such as an EPROM, or PROM) and associated socket, and other removable storage units 1722 and interfaces 1720 which allow software and data to be transferred from the removable storage unit 1722 to computer 1700.

Computer 1700 may also include a communication interface 1724. Communication interface 1724 allows software and data to be transferred between computer 1700 and other devices, such as communication between any of input blocks, display screen, node, or other supplemental devices. Communication interface 1724 may include a modem, a network interface (such as an Ethernet card), a communication port, a PCMCIA slot and card, or the like. Software and data transferred via communication interface 1724 can be in the form of signals, which can be electronic, electromagnetic, optical, or other signals capable of being received by communication interface 1724. These signals can be provided to communication interface 1724 via a communication path 1726. Communication path 1726 carries signals and can be implemented using wire or cable, fiber optics, a phone line, a cellular phone link, an RF link or other communication channels.

Computer 1700 can include a non-transitory computer readable medium such as removable storage unit 1718, removable storage unit 1722, and a hard disk installed in hard disk drive 1712. Computer program medium and computer usable medium may also refer to memories, such as main memory 1708 and secondary memory 1710, which can be memory semiconductors (e.g. DRAMs, etc.).

Computer programs (also called computer control logic) or databases are stored in main memory 1708 or secondary memory 1710. Computer programs may also be received via communication interface 1724. Such computer programs, when executed, enable computer 1700 to implement the embodiments as discussed herein. In particular, the computer programs, when executed, enable processor 1704 to implement the processes of the embodiments discussed here. Accordingly, such computer programs represent controllers of computer 1700. Where the embodiments are implemented using software, the software can be stored in a computer program product and loaded into computer 1700 using removable storage drive 1714, interface 1720, and hard disk drive 1712, or communication interface 1724.

Embodiments of the inventions also can be directed to computer program products comprising software stored on any computer useable medium. Such software, when executed in one or more data processing device, causes a data processing device(s) to operate as described herein. Embodiments of the inventions may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

Further, references to "an embodiment," "embodiments," etc., indicate that the embodiment described may include a particular feature, structure, or characteristic, but every embodiment may not necessarily include the particular feature, structure, or characteristic. Further, when a particular feature, structure, or characteristic is described in connection with an embodiment, it is submitted that it is within the knowledge of one skilled in the art to affect such feature, structure, or characteristic in connection with other embodiments whether or not explicitly described.

What is claimed is:

1. A display stand unit for a retail environment, the display stand unit comprising:
    a base having an interior;
    a display stand comprising:
        a stem that connects to and extends upwardly from the base; and
        a charger comprising a receiving surface that is suspended above and spaced away from the base by the stem, wherein the charger is configured to inductively charge and to releasably magnetically hold an electronic device above and spaced away from the base;
    a security cable that extends out from the base, wherein the security cable is configured to attach to the electronic device at a position separate and spaced apart from the receiving surface to movably secure the electronic device to the base; and
    a retractor disposed within the interior of the base and connected to the security cable, wherein the retractor is configured to automatically retract the security cable.

2. The display stand unit of claim 1, wherein the display stand is a first display stand, the security cable is a first security cable, and the retractor is a first retractor, and the display stand unit further comprises:
    a second display stand that is identical to the first display stand and that is configured to releasably hold a second electronic device above and spaced away from the base;
    a second security cable that extends out from the base, the second security cable is configured to attach to the second electronic device to movably secure the second electronic device to the base; and
    a second retractor disposed within the interior of the base and connected to the second security cable, wherein the second retractor is configured to automatically retract the second security cable.

3. The display stand unit of claim 1, further comprising a printed circuit board assembly disposed within the base, wherein the printed circuit board assembly is configured to monitor a security circuit that comprises the security cable.

4. The display stand unit of claim 3, further comprising a dedicated interface cable that connects the charger to the printed circuit board assembly and supplies power to the charger,
    wherein the dedicated interface cable is distinct from the security cable.

5. A retail display comprising:
    a table; and
    the display stand unit of claim 1 disposed on the table.

6. The display stand unit of claim 1, further comprising a power cable that extends through the stem and connects to the charger to provide power to the charger,
    wherein the security cable extends out from the base separately from the stem.

7. The display stand unit of claim 1, wherein during the automatic retraction the retractor is configured to spool the security cable radially in a single horizontal plane without vertical overlap of the security cable.

8. The display stand unit of claim 1, further comprising a guide that guides the security cable out of the interior of the base.

9. The display stand unit of claim 8, wherein the guide is a roller guide that is configured to transition the orientation of the security cable from a horizontal orientation within the interior of the base to a vertical orientation as the security cable extends from the interior of the base.

10. A display stand unit for a retail environment, the display stand unit comprising:
   a base having an interior,
   a display stand comprising:
      a stem that connects to and extends upwardly from the base, and
      a receiving surface that is suspended above and spaced away from the base by the stem, the receiving surface configured to releasably hold an electronic device above and spaced away from the base,
   a security cable that extends out from the base, the security cable is configured to attach to the electronic device to movably secure the electronic device to the base, and
   a retractor disposed within the interior of the base and connected to the security cable, wherein the retractor is configured to automatically retract the security cable, and wherein the retractor comprises:
      a stator comprising a fixture and an electronic contact that each extend through the stator;
      a housing assembly comprising:
         a first housing rotatably coupled to the fixture, wherein the first housing is fixed to the security cable, wherein the first housing comprises a contact spring provided on a first side of the first housing, and wherein the contact spring is electronically coupled to an end of the security cable;
         a protrusion that extends from a second side of the first housing away from the stator, the protrusion creating a core wall around which the security cable is configure to spool; and
         a second housing spaced away from the second side of the first housing; and
      a torsion spring that biases the housing assembly in a retraction direction, the torsion spring comprising a first end that is attached to the fixture and a second end that is connected to at least one of the first housing and the second housing,
   wherein the contact spring remains in direct electronic contact with the electronic contact of the stator as the first housing rotates about the fixture relative to the stator.

11. The retractor of claim 10, wherein the core wall has a spiral shape.

12. The retractor of claim 10, wherein the torsion spring exerts a biasing force on the security cable between 0.4 and 1.0 Newtons.

13. The retractor of claim 10, wherein the first housing comprises a channel disposed inward relative to the protrusion and the end of the security cable is disposed in the channel.

14. The retractor of claim 10, further comprising an electronic interface cable connected to the electronic contact of the stator.

15. A display stand unit for a retail environment, the display stand unit comprising:
   a base having an interior,
   a display stand comprising:
      a stem that connects to and extends upwardly from the base, and
      a receiving surface that is suspended above and spaced away from the base by the stem, the receiving surface configured to releasably hold an electronic device above and spaced away from the base,
   a security cable that extends out from the base, the security cable is configured to attach to the electronic device to movably secure the electronic device to the base; a retractor disposed within the interior of the base and connected to the security cable, wherein the retractor is configured to automatically retract the security cable;
   a printed circuit board assembly disposed within the interior; and
   an alarm connected to the printed circuit board assembly,
   wherein the security cable comprises a security pod configured to be adhered to the device, the security pod comprising a resistor, wherein the security cable and the resistor are connected in a security circuit and the printed circuit board assembly is configured to measure a resistance of the security circuit,
   wherein the printed circuit board assembly is electrically connected to the security cable and is configured to receive electrical signals indicative of tampering with the security cable,
   wherein the electrical signals indicative of tampering comprise the resistance of the security circuit measured by the printed circuit board assembly exceeding a tolerance, and
   wherein in response to detecting the electrical signals indicative of tampering with the security cable the printed circuit board assembly is configured to activate the alarm.

16. The display stand unit of claim 15, further comprising the device,
   wherein the security pod further comprises a security switch that is configured to open in response to removal of the security pod from the device,
   wherein the security switch is connected in series in the security circuit, and
   wherein the electrical signals indicative of tampering comprise an opening of the security circuit detected by the printed circuit board assembly.

17. The display stand unit of claim 16, wherein the security circuit is configured to open in response to cutting the security cable and the printed circuit board assembly is configured to detect the opening of the security circuit and activate the alarm in response.

18. The display stand unit of claim 16, wherein the security circuit is configured to open in response to an opening of the security switch and the printed circuit board assembly is configured to detect the opening of the security switch and activate the alarm in response.

19. The display stand unit of claim 15, further comprising an interface cable that connects the printed circuit board to a power supply and to the alarm.

20. The display stand unit of claim 1, further comprising a spring that biases the retractor to automatically retract the security cable.

21. The display stand unit of claim 1, wherein the retractor is positioned horizontally and lies flat within the interior of the base.

22. A display stand unit for a retail environment, the display stand unit comprising:
   a base having an interior;
   a first display stand comprising:
      a stem that connects to and extends upwardly from the base; and
      a receiving surface that is suspended above and spaced away from the base by the stem, the receiving surface configured to releasably hold a first electronic device above and spaced away from the base;

a first security cable that extends out from the base, wherein the first security cable is configured to attach to the first electronic device to movably secure the first electronic device to the base;

a first retractor disposed within the interior of the base and connected to the first security cable, wherein the first retractor is configured to automatically retract the first security cable;

a second display stand that is identical to the first display stand and that is configured to releasably hold a second electronic device above and spaced away from the base;

a second security cable that extends out from the base, wherein the second security cable is configured to attach to the second electronic device to movably secure the second electronic device to the base; and a second retractor disposed within the interior of the base and connected to the second security cable, wherein the second retractor is configured to automatically retract the second security cable.

23. The display stand unit of claim 22, wherein the first display stand comprises a charger, wherein the charger comprises the receiving surface, and wherein the charger is configured to provide power to the first electronic device when the first electronic device is releasably held by the receiving surface.

24. The display stand unit of claim 23, wherein the first display stand comprises a power cable that extends through the stem and connects to the charger to provide power to the charger, and wherein the first security cable extends out from the base separately from the stem.

* * * * *